United States Patent [19]

Bilbao

[11] 4,255,854
[45] Mar. 17, 1981

[54] GRAPEFRUIT CUTTING KNIFE

[76] Inventor: Francisco Bilbao, 5775 SW. 8 St., Miami, Fla. 33144

[21] Appl. No.: 67,814

[22] Filed: Aug. 20, 1979

[51] Int. Cl.³ .............................................. A21C 5/08
[52] U.S. Cl. ...................................... 30/114; 30/287; 30/299; 30/304
[58] Field of Search ................. 30/114, 299, 287, 303, 30/304, 305

[56] References Cited

U.S. PATENT DOCUMENTS

| 374,777 | 12/1887 | Collins | 30/287 |
|---|---|---|---|
| 1,226,797 | 5/1917 | Newman | 30/304 |
| 1,442,577 | 1/1923 | Kugel et al. | 30/299 |
| 1,638,956 | 8/1927 | Pinchbeck et al. | 30/299 |
| 2,321,725 | 6/1943 | Alderfer | 30/114 |
| 2,797,478 | 7/1957 | Gebhart et al. | 30/114 |

FOREIGN PATENT DOCUMENTS 82488  1/1964  France ........................................ 30/304

*Primary Examiner*—Othell M. Simpson
*Assistant Examiner*—J. T. Zatarga
*Attorney, Agent, or Firm*—John Cyril Malloy

[57] ABSTRACT

A grapefruit cutting knife which is composed of a handle and a bifurcated working end with terminal ends which are serrated and which overlay one another for a scissor-type action in cutting the membranes between sections of grapefruit and there is provided an upstanding pair of knife-like members for slicing the grapefruit section from the membrane.

1 Claim, 3 Drawing Figures

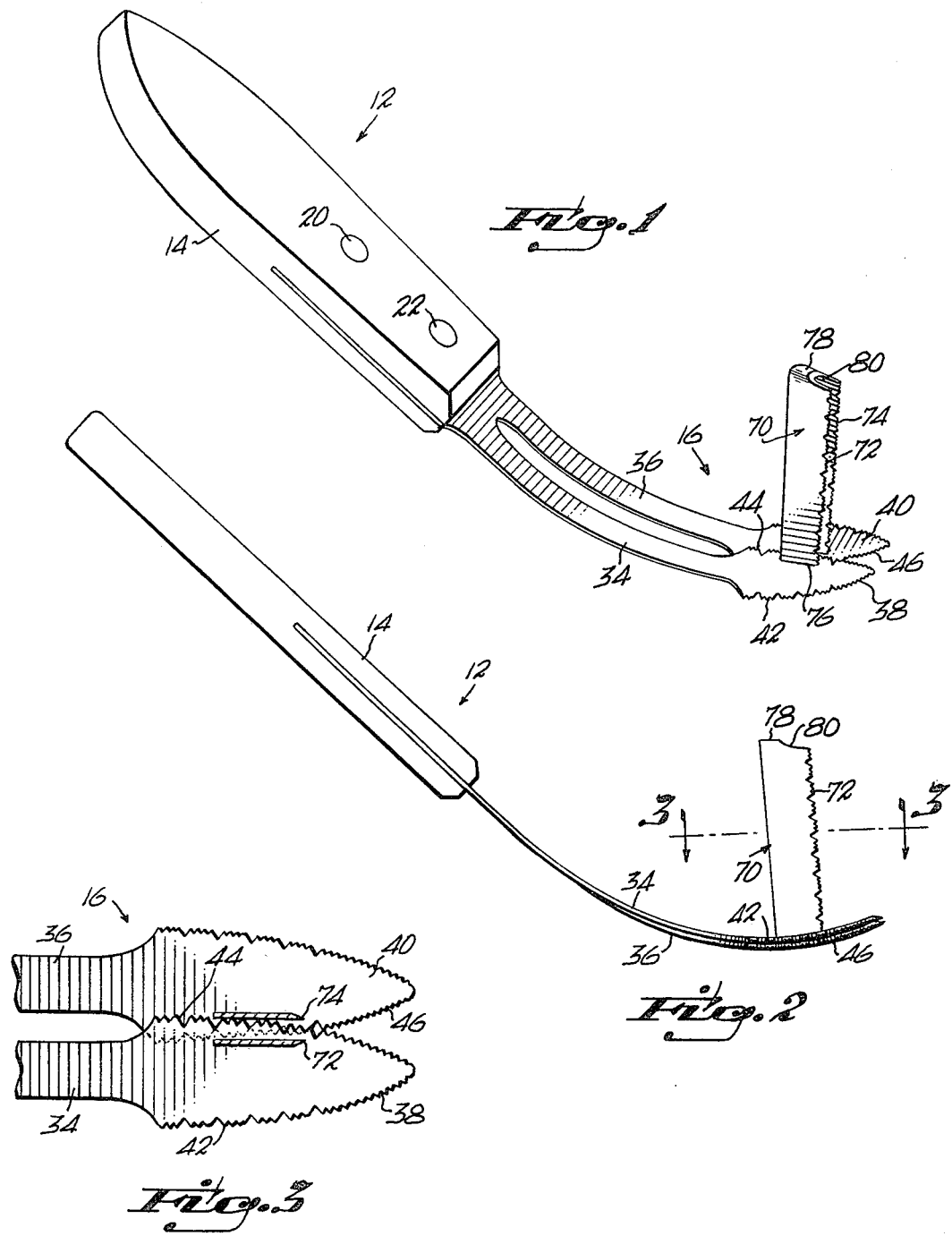

GRAPEFRUIT CUTTING KNIFE

FIELD OF THE INVENTION

This invention relates to a grapefruit cutting knife.

OBJECTS OF THE INVENTION

It is an object of this invention to provide an improved grapefruit cutting knife for use in removing grapefruit sections from the membrane in a slicing action, the grapefruit knife being composed of a handle having a working end which is bifurcated and the terminal ends of which are pointed and rearwardly serrated on both sides, with the adjacent edges overlaying one another and including in upstanding relation on each of the overlaying edges a knife-like member which faces forwardly and is serrated along the vertical leading edge and which are joined at the upper ends by a bridging member.

Generally speaking, it is an object of this invention to provide an improved grapefruit cutting knife which is simple, inexpensive to manufacture, well adapted for the purposes which are set forth hereinafter, and which is strong and durable and which is highly adapted for use in severing grapefruit sections from the membrane in a grapefruit.

In accordance with these and other objects which will become apparent hereinafter, the instant invention will now be described with reference to the accompanying drawings in which:

DESCRIPTION OF THE DRAWINGS

FIG. 1 is a perspective of the instant invention;

FIG. 2 is a side elevation of the invention shown in FIG. 1;

FIG. 3 is an enlarged partial view taken on the plane indicated by the line 3—3 of FIG. 2 and looking in the direction of the arrows.

DESCRIPTION OF THE PREFERRED EMBODIMENT

Referring to the drawings wherein like reference characters designate like or corresponding parts throughout the several views and referring particularly to FIG. 1 wherein a grapefruit knife is generally designated by the numeral 12 is shown, the same being composed of a handle 14 and a working end 16, the two being secured by suitable means such as the connectors 20 and 22. The working end is bifurcated defining a first leg 34 and a second leg 36 each with a sharpened or pointed terminal end 38 and 40 the edges of which, such as 42 and 44, are serrated defining knife edges and one edge of which, 44, the inner edge overlays the adjacent inner edge 46 so as to define scissor-like serrated cutting members in response to a member entering perpendicular thereto, as the membrane between sections of a grapefruit. In upstanding relation on the end zone there is a generally U-shaped member 70 having a serrated leading vertical edge 72 and 74 one of which is somewhat shorter than the other but both of which extend upwardly generally as a tower being supported on each of the terminal ends as at 76. The upper end 78 is provided with a bridging member which is recessed as at 80 to take out seeds. In use, the member is inserted downwardly in a grapefruit while the membrane between grapefruit sections is sliced while the cutting edges of the tower slice along the membrane on opposite sides to sever the grapefruit sections from the membrane.

While the instant invention has been shown and described herein what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. A grapefruit knife comprising:
   a handle, and
   a working end comprising;
   an arcuate bifurcated end defining first and second legs, each leg having rearwardly serrated edges and a pointed terminal end, each leg having an inner portion, one inner portion in overlaying relation to the other, and a cutting tower extending vertically a predetermined distance in a perpendicular direction from the overlaying inner portions comprising a U-shaped member having forwardly facing vertically extending serrated leading edges, one vertical leading edge being slightly higher than the other, and a bridge member joining the vertical leading edges, the bridge member being recessed and defining a seed removal means.

* * * * *